United States Patent [19]

Dede Garcia-Santamaria

[11] Patent Number: 4,780,803
[45] Date of Patent: Oct. 25, 1988

[54] HIGH FREQUENCY GENERATOR TO BE USED IN INDUCTION HEATING, LASER, PLASMA AND THE ALIKE

[75] Inventor: Enrique-Juan-Francisco Dede Garcia-Santamaria, Valencia, Spain

[73] Assignee: G. H. Industrial S.A., San Antonio Benageber-Valencia, Spain

[21] Appl. No.: 922,088

[22] Filed: Oct. 22, 1986

[30] Foreign Application Priority Data

Oct. 2, 1986 [ES] Spain ................. 8602373

[51] Int. Cl.⁴ ........................... H02P 13/20
[52] U.S. Cl. ..................... 363/98; 363/132
[58] Field of Search ............ 363/98, 132, 49; 323/207, 901

[56] References Cited

U.S. PATENT DOCUMENTS

| | | | |
|---|---|---|---|
| 3,718,852 | 2/1973 | Bailey | 219/10.77 X |
| 3,725,770 | 4/1973 | Bailey | 363/49 |
| 4,259,620 | 3/1981 | Oates et al. | 363/132 X |
| 4,385,348 | 5/1983 | Wisner | 363/49 X |
| 4,424,557 | 1/1984 | Steigerwald | 363/132 X |
| 4,504,895 | 3/1985 | Steigerwald | 363/132 X |
| 4,541,041 | 9/1985 | Park et al. | 363/132 X |
| 4,618,920 | 10/1986 | Fox | 363/132 X |
| 4,621,312 | 11/1986 | Yuzurihara et al. | 363/132 X |
| 4,626,983 | 12/1986 | Harada et al. | 363/132 |
| 4,628,426 | 12/1986 | Steigerwald | 363/132 X |
| 4,641,232 | 2/1987 | Pitel | 363/98 X |
| 4,698,743 | 10/1987 | Onodera et al. | 363/136 |

Primary Examiner—Patrick R. Salce
Assistant Examiner—Marc S. Hoff
Attorney, Agent, or Firm—Ladas & Parry

[57] ABSTRACT

A high frequency generator is coupled to a resonant load. An inverter is swept through a range of frequencies at reduced power. The phase difference between the load current and voltage is measured. When the phase difference is at or near zero, the resonant frequency of the load is detected and the inverter provides full power to the load. The phase difference between the load current and voltage is monitored during operation so that the operating frequency of the inverter can be changed as the resonant frequency of the load changes.

4 Claims, 2 Drawing Sheets

HIGH FREQUENCY GENERATOR TO BE USED IN INDUCTION HEATING, LASER, PLASMA AND THE ALIKE

The present invention refers to a transistor generator for producing high-frequency currents. This kind of generator can be used with slight variants at the output circuits in induction heating generators, laser equipments, plasma equipment and the alike.

In the prior art, two different types of generators for producing high-frequency currents, are known, namely:

a. Up to a frequency on the order of 50 KHz, by means of the thyristors synchronizing the load to a frequency being a multiple of the working frequency of the thyristor inverter.

b. From 100 KHz up to several MHz, by means of the use of the generators with high-frequency electronic values.

The main disadvantages of these systems are:

(a) In the thyristor generators, the frequency is limited to only 50 KHz and they usually use a static inverter working at 10 KHz. The adjustment of the load to a frequency being multiple of the main frequency, is a delicate and difficult operation. As a consequence of this adjustment to a frequency multiple, the equipment output is relatively low.

(b) In electronic valve generators, wherein there is hardly frequency limitation, the first disadvantage is the use of electronic vacuum valves. These valves have a life of 5,000 to 6,000 hours, after which they must be removed, with the corresponding cost. On the other hand, these electronic valves must be supplied with a high voltage, therefor which requires using a booster transformer and a diode-rectifier bridge, which causes consequent volume and personal security problems. The energy output these equipments extends from the 50–55% of classic generators to the 70% for aperiodic generators.

The transistor generator claiimed by the invention, solves these disadvantages and displays the following advantages:

a. It can work at any frequency, from the power-syetem one up to several hundred KHz.

b. The energy output is very high, depending on the application, but, in any case, over 90%.

c. There is no high-voltage power supply.

d. It allows the automatic tracking of frequency variations produced in the load, by change of the latter or by modifications of its electric characteristics along, for instance, a heating process.

e. It has a greatly reduced volume.

The invention comprises the following assemblies and systems:

1: Diode-rectifier bridge.
2: Chopper.
3: Starter.
4: Insulating coils.
5: Transistor inverter.
6: Automatic frequency tracking system.
7: Regulation and protection system.
8 and 9: Trigger circuits.
10: Supply, supervision and control-signal generation system.
11 and 12: Transformers.

The aim of these structures is delivering to a load, being essentially a resonant circuit, an adjustable frequency being equal to or very near the resonance frequency characteristic of the load over time. This output power varies its frequency automatically in order to track any change in the resonance frequency characteristic of the load, produced by changes in this load or in the electric characteristic thereof.

The resonance frequency characteristic of the loads being used in induction heating, laser, plasma or the alike, varies according to the application and even for a same application along the heating and excitation process.

So that the inverter transistors work properly and deliver the power to the load, it is necessary for the inverter to work at the resonance frequency of the charge or very near it. Besides, the inverter must not receive power in appreciable amounts if it is not working at the resonance frequency characteristic of the load or near it.

The proceeding to achieve this frequency adjustment is as follows:

By means of an auxiliary circuit, variable frequency pulses are delivered to the transistor inverter and, consequently, to the load resonant circuit.

The phase difference between voltage and charge current is instantly measured along all the range of frequency being delivered. When the phase difference is zero or near zero, it means that the frequency at which the pulses are being delivered is equal to or very near the resonance frequency of the load oscillating circuit. The circuit then stabilizes its working at that frequency and at the same time transmits a signal to the starter circuit, allowing the power to pass on to the inverter and, consequently, to the load.

The frequency tracking automatic system begins operation at the moment of start and continues operation during power generation.

Its aim is to establish a load frequency sweep through the transistor inverter. The phase difference between current and voltage in the load at these frequencies is measured, so that, when this phase difference is zero or near zero, it is due to the fact that the frequency at which the sweep is being made, is the same as the resonance frequency characteristic of the load, and at this moment the inverter is stabilized at this frequency power is delivered to the inverter and, through it, to the load.

The starter is the circuit used to limit the delivery of current to the inverting bridge and, consequently, to the load, to a very low value if the inverter working frequency is not equal to or near that of the load.

On the contrary, it must allow the free passage of the current when the inverter has stabilized its working at the resonance frequency characteristic of the load.

In a practical embodiment, the starter basically comprises a resistance and a transistor in parallel. When the inverter working frequency is different from the resonance frequency characteristic of the load, the automatic frequency tracking circuit transmits a signal which blocks the transistor and, therefore, the current must pass through the resistance, this being of such a value that it limits the current.

When the stable working has been reached and, consequently the inverter frequency is equal to or near that characteristic of the load, the automatic frequency tracking circuit unblocks the transistor and makes it conductive.

Figure 1:
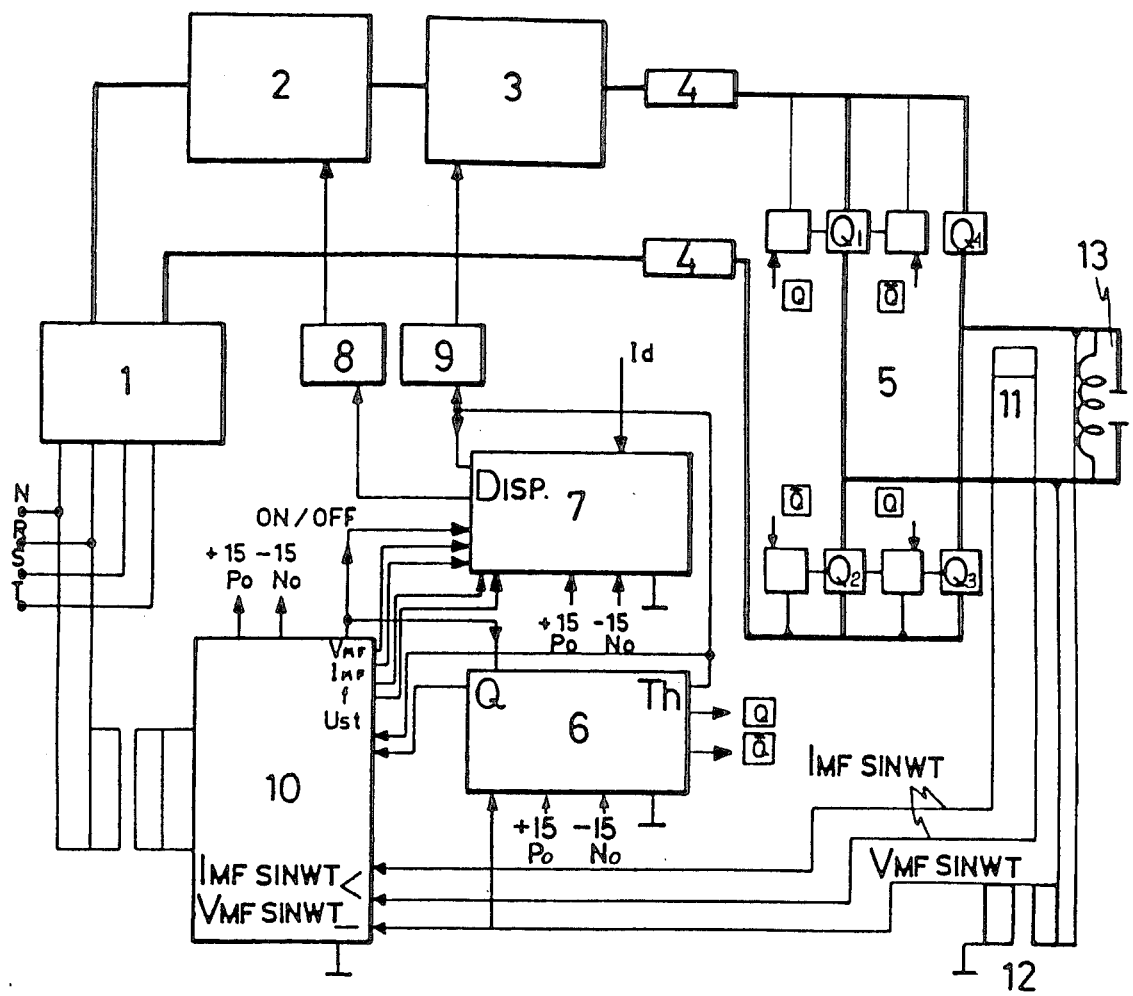
FIG. 1 is a circuit diagram of the high frequency generator according to the present invention.

In order to achieve these results, the generator has been provided with a structure such as that one represented in FIG. 1 and a series of circuits, the originality of which is also claimed, has been designed.

According to the diagram of FIG. 1, its working is hereinafter described.

The supply three-phase network current is conveyed to a diode rectifier bridge -1- which transforms it into a direct current for supplying the inverter. This direct current passes through a chopper -2- which controls the power delivered to the load by means of the amplitude of the pulse being applied to the chopper transistor. Said control may be performed manually or by means of a voltage or current reference which may be provided by an internal of external generator.

After the chopper, the direct current passes through the starter -3-, the working of which is described hereinafter and the main function of which is to limit the current being delivered to the load when the frequency of the master pulses is equal to or very close to the resonance frequency characteristic of the load. Once the synchronization between master pulses and the frequency characteristic of the load has been achieved an automatic circuit removes this starter and the chopper freely delivers the power to the load up to a predetermined value. The current passes onto the inverting transistor circuit through a pair of insulating coils -4-, the main function of which is to become a curent supply for the load instead of a voltage supply. At the same time, these insulating coils avoid the high-frequency currents to go backwards from the load and the inverter towards the supply circuit.

The transistor inverter -5- has a complete bridge pattern, the switching frequency of which is automatically adjusted to the frequency of the load, with variable charges or with variable characteristics of the charge during the heating process.

Other bridge patterns, such as semibridge or the alike, can also be used.

MOSFET transistors, bipolar transistors or combinations thereof or the alike, can be used.

An electronic system for automatic frequency tracking -6- adjusts the trigger pulses being delivered to the transistor inverter to the resonance frequency characteristic of the load.

The whole assembly is controlled by control electronic charts -7- and -10- including all regulation and protection systems.

The transformers -11- and -12- convey the voltage and current signals of the load -13- to the control plate.

In laser cavities and in induction heating circuits, the load can vary according to the application and, besides, the electrical characteristics of the load vary with the heating process. As a consequence of said variation of the electrical characteristics, the resonance frequency characteristic of the charge circuit varies according to the different applications and also with the heating process. The optimum power transmission and, therefore, the best energy output are achieved when the generator frequency is exactly the same as the frequency characteristic of the load.

This can be achieved with the automatic frequency tracking system, the functioning of which consists of the generation of a series of trigger pulses to the transistors of the inverting bridge, the frequency of which gradually varies.

Simultaneously, and by means of the corresponding circuit, the phase difference between voltage and load current is measured. At it is known, when the pulse frequency is different from the frequency characteristic of the load, there is an phase difference between voltage and current. Load voltage and current are only inphased or near zero phase difference when both frequencies coincide or are very close. The automatic frequency tracking system produces these variable frequency pulses and detects the phase difference between load voltage and current. When the phase difference is zero or near zero, these pulses remain on said frequency and an order is transmitted for the starter transistor to be saturated, all the power being thereby delivered to the load with the only limitations of those being previously established by the corresponding controls. Where it is convenient, the rectifier, the chopper and, in its case, the starter, can be substituted by a controlled thyristor or, indistinctly, transistor rectifier, thereby achieving the same effects as those of the substituted elements.

Figure 2:
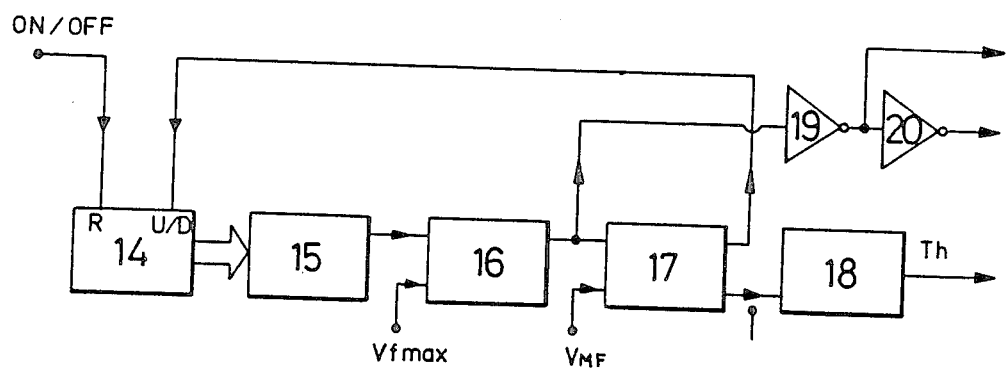
FIG. 2 is a diagram of the automatic frequency tracking circuit 6 of FIG. 1.

FIG. 2 displays, with an explanatory but not limitative character, a circuit used for the automatic frequency tracking.

It comprises the following elements:

14: Meter.
15: D/A Converter.
16: Oscillator.
17: Module and phase difference signal detector.
18: Comparator with hysteresis.

FUNCTIONING DESCRIPTION

Before switching the power (ON/OFF signal), the meter -14- is blocked, and, therefore, the A/D converter output is zero and, consequently, Vfmax establishes that the control oscillator (VCO) -16- must oscillate at the maximum frequency. When the power is switched, the meter is unblocked and starts to count upwards, and, due to this, the converter -15- output begins to increase, making the VCO produce pulses with a gradually lower frequency. Through the amplifiers -19- and -20-, these pulses become trigger pulses of the transistor inverter -5-. Through the module and phase difference signal detector -17- the phase difference between load voltage and current is monitored. When the phase difference signal changes, the meter -14- counts downwards and the Vco -16- tends to produce pulses of increasing frequency. The balance is reached when the load phase difference is null and, therefore, the transistor inverter -5- trigger pulse frequency is the same as that of the load. The system can therefore track at any given moment the load frequency variations.

STARTER CIRCUIT DESCRIPTION

Figure 3:
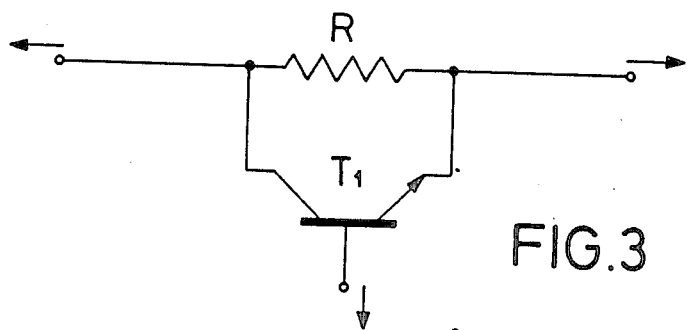
FIG. 3 is a diagram of the starter circuit.

The starter circuit, if the switching networks are removed so that it is clearer, is that one being displayed in FIG. 3.

The transistor (T1) is controlled by the automatic frequency tracking circuit (FIG. 2), so that if the outphasing between the load voltage and current is not almost zero, the comparator with hysteresis -18- output of FIG. 2 is such that it blocks the transistor (T1) and, therefore, in that case the current is limited through resistance R.

The comparator -18- output also acts upon the regulation plate -7-, so that when said phase difference is not near zero, the chopper -2- pulse amplitude is minimum.

When the phase difference is zero or near zero, the inverting bridge -5- trigger pulse frequency produced by the Vco -16- is near the resonance one of the load -13- and the signal changes state saturating the transistor (T1) and consequently short-circuiting the limitant resistance R.

On the other hand, the chopper pulse amplitude increase with a time constant being defined from the minimum until the current or the voltage reach the predetermined values.

Figure 4:
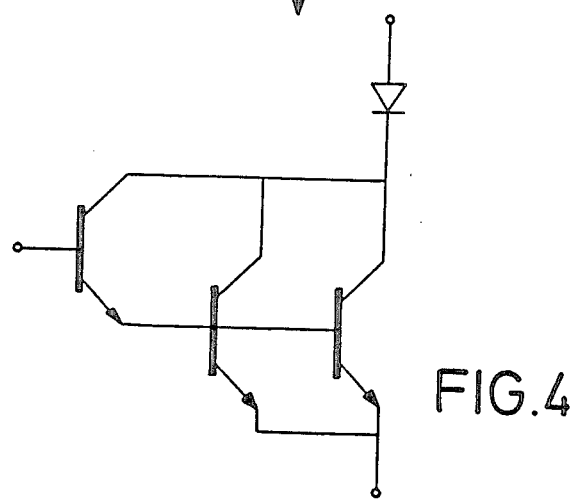
FIG. 4 is a diagram of the practical embodiment of blocks Q1-Q4 of inverter 5.

The active structure, represented in FIG. 4, corresponds to the practical embodiment of blocks Q1, Q2, Q3 and Q4 of the inverter -5-, it being considered that the structure of a diode followed by transistors can be modified even using another kind of transistor, such as MOFSET combinations of MOSFET and bipolar transistors. So that it is clearer, the switching networks have been omitted deliberately.

I claim:

1. A high frequency generator for a resonant load comprising:

inverter means for producing a high frequency power waveform for coupling to a resonant load;

frequency generator means coupled to said inverter means for frequency sweeping said load;

measuring means coupled to said load for measuring the phase difference between voltage and current in said load during said frequency sweep;

control means coupled to said measuring means for determining when said phase difference is at or near zero to detect the resonant frequency of said load; and for providing a control signal indicative thereof to said inverter means, said inverter means being responsive to said control signal for producing said high frequency power waveform to said load substantially at said resonant frequency.

2. The generator of claim 1 further comprising starting means for limiting power to said invertor means and thereby to said load until said frequency is substantially at said resonant frequency.

3. The generator of claim 2 wherein said inverter means comprises a transistor bridge invertor.

4. The generator of claim 1 wherein said measuring means is continuously operable to maintain said inverter means substantially at the resonant frequency of said load as said resonance frequency changes during operation of said load.

* * * * *